(12) United States Patent
Poma

(10) Patent No.: US 8,282,083 B1
(45) Date of Patent: Oct. 9, 2012

(54) CORROSION RESISTANT RAILING INSERT AND METHOD FOR INSTALLATION

(75) Inventor: Frank Poma, Port St. Lucie, FL (US)

(73) Assignee: Poma & Sons, Inc., Palm City, FL (US)

( * ) Notice: Subject to any disclaimer, the term of this patent is extended or adjusted under 35 U.S.C. 154(b) by 407 days.

(21) Appl. No.: 11/425,591

(22) Filed: Jun. 21, 2006

(51) Int. Cl.
*E04H 17/00* (2006.01)

(52) U.S. Cl. ............ 256/65.01; 256/59; 256/65.06; 256/65.07; 403/10; 403/264; 52/184; 52/165

(58) Field of Classification Search ............ 256/1, 12.5, 256/21, 22, 24, 25, 26, 27, 34, 65.01, 67, 256/65.02, 65.06, 59, 65.04, 65.07; 52/184, 52/186, 165; 403/10, 264, 402, 269; 411/418
See application file for complete search history.

(56) References Cited

U.S. PATENT DOCUMENTS

| | | | | |
|---|---|---|---|---|
| 2,654,579 A * | 10/1953 | Cremens | ............. | 256/21 |
| 3,498,589 A * | 3/1970 | Murdock | ............. | 256/70 |
| 3,810,339 A | 5/1974 | Russo | | |
| 3,835,615 A | 9/1974 | King, Jr. | | |
| 3,893,271 A | 7/1975 | Kotlarz | | |
| 4,050,828 A * | 9/1977 | Noro | ............. | 403/201 |
| 4,480,819 A * | 11/1984 | Lopez | ............. | 256/1 |
| 4,809,955 A * | 3/1989 | Veilleux | ............. | 256/65.02 |
| 4,930,284 A | 6/1990 | Falco | | |
| 5,152,507 A * | 10/1992 | Lee | ............. | 256/13.1 |
| 5,490,365 A * | 2/1996 | Roth | ............. | 52/704 |
| 5,695,174 A * | 12/1997 | Tsai | ............. | 256/22 |
| 5,807,051 A | 9/1998 | Heminger | | |
| 5,888,334 A | 3/1999 | Abraham | | |
| 5,931,450 A * | 8/1999 | Yoder | ............. | 256/66 |
| 6,299,142 B1 * | 10/2001 | Chaney et al. | ............. | 256/65.12 |
| 6,311,957 B1 | 11/2001 | Driscoll et al. | | |
| 6,382,866 B1 * | 5/2002 | Zihlmann | ............. | 403/255 |
| 6,484,471 B2 | 11/2002 | Steed | | |
| 6,840,504 B2 * | 1/2005 | Hagiwara et al. | ............. | 251/332 |
| 7,032,891 B2 * | 4/2006 | Rowley et al. | ............. | 256/26 |
| 7,530,550 B2 * | 5/2009 | Fattori | ............. | 256/65.05 |
| 2004/0177586 A1 | 9/2004 | McLean | | |

* cited by examiner

*Primary Examiner* — William Gilbert
*Assistant Examiner* — Chi Q Nguyen
(74) *Attorney, Agent, or Firm* — Malin Haley DiMaggio Bowen & Lhota, P.A.

(57) ABSTRACT

A corrosion resistant railing insert including a stainless steel upper body for insertion into a railing post and including channels for liquid drainage from the railing post, an elongated stainless steel mounting arm protruding from the upper body. The mounting arm has a smaller cross-sectional area than the upper body, which are integrally associated as a unitary device. The upper body is secured within a railing post while the mounting aim is inserted into a complimentary aperture or sleeve formed in a concrete substrate and secured therein with an adhesive.

18 Claims, 4 Drawing Sheets

CORROSION RESISTANT RAILING INSERT AND METHOD FOR INSTALLATION

BACKGROUND OF THE INVENTION

1. Field of the Invention

The present invention relates generally to handrails and more specifically to corrosion resistant handrails to be installed in concrete balconies.

2. Description of Related Art

The aluminum handrail industry suffers from a serious problem. Hundreds of millions of dollars are spent each year on repairing concrete balcony edges and replacing railings due to the corrosion that occurs when aluminum is embedded in concrete in a harsh (beach or salty) environment. The problem arises because the concrete balcony edges are reinforced with steel reinforcement bars. These reinforcement bars are located between 1.5"-2" from the edge of the concrete slab. Typically, when installing an aluminum handrail, a post must be embedded into the concrete. Thus, it is necessary to drill a large hole, which oftentimes cuts or contacts the steel reinforcements. Consequently, when the aluminum posts are installed, they are in contact with the steel reinforcement bars and cause electrolysis, in which the aluminum becomes the sacrifice metal and expands. When the aluminum expands, it begins to disintegrate and the surrounding concrete spalls.

Most bases around the aluminum post are composed of gypsum, which deteriorates over time. When the posts are used in a coastal setting, the deterioration produces a pocket and allows for saltwater intrusion. When this occurs, the surrounding concrete becomes less alkaline and causes the reinforcement to expand and form hairline fractures in the concrete. When moisture seeps into the pocket around the post, the aluminum oxidizes and expands. The combination of these effects creates a safety issue because the concrete loses strength and structure.

Several attempts to create further stability in the handrail business have been presented. For example, U.S. Patent Application number 2004/0177586 published by McLean on Sep. 16, 2004 is entitled BALUSTER RETAINING MEMBER. This patent discloses a baluster retaining member for connecting the end of a baluster to an opening in a rail of a railing system. The rail and baluster sections are oriented with respect to one another at an angle so that when the baluster is connected to the rail by the member and the rail is positioned for use adjacent a stairway at an angle from the horizontal, the baluster is oriented vertically.

U.S. Pat. No. 6,484,471 issued to Steed on Nov. 26, 2002 is entitled ADHESIVE FIXED ANCHORS. An anchoring member is disclosed for anchoring an object to a supporting surface having a bore for receiving the anchoring member. The anchoring member comprises an elongate cylindrical body having a penetrating end arranged to be embedded in the bore and an exposed end opposite the penetrating end. An adhesive compound arranged to be coated about the penetrating end of the body secures the body within the bore.

U.S. Pat. No. 6,311,957 issued to Driscoll et al. on Nov. 6, 2001 is entitled DEVICE AND METHOD FOR ATTACHING BALUSTERS. This patent related to a device for attaching a polygonal baluster end to a handrail or base. This device includes a connector which is generally cylindrical. This connector also defines an internal axial channel having a polygonal cross-section. The axial channel is adapted to receive the polygonal baluster end.

U.S. Pat. No. 5,888,334 issued to Abraham on Mar. 30, 1999 is entitled METHOD OF INDICATING THE LOCATION AND DEPTH OF AN ANCHOR IN A HOLE IN A SUBSTRATE AND DRILLING THROUGH FILL MATERIAL TO THE ANCHOR. The invention is a fixture that can be readily mounted to a surface by embedding and adhering an internally threaded anchoring element in a hole in the surface. The fixture can then be removed and replaced or the fixture can be removed and the hole covered. The end of the fixture is also threaded so that it firmly attaches to the anchor.

U.S. Pat. No. 5,807,051 issued to Heminger on Sep. 15, 1998 is entitled DIELECTRIC ADHESIVE INSERT ANCHOR, and discloses a dielectric adhesive insert anchor including an anchor body and a screw member for insertion into a drilled hole in a substrate containing an adhesive. A friction segment includes an internally threaded cavity in which to receive a screw member. An adhesion segment includes a cylindrical section and a plurality of saucer-shaped buttons positioned along its length ending with a terminal button. Both the anchor member and screw members are preferably constructed of carbon steel or stainless steel.

U.S. Pat. No. 4,930,284 issued to Falco on Jun. 5, 1990 is entitled MASONRY ANCHOR. This patent teaches a masonry fastening system in which a porous sleeve filled with a hardenable adhesive mass is inserted in a hole interconnecting two or more masonry elements with an anchoring pin having a tapered or conical shape, the anchoring pin being insertable into the sleeve, through the hardenable mass.

U.S. Pat. No. 3,893,271 issued to Kotlarz on Jul. 8, 1975 is entitled BASIC BEAM STRUCTURAL MEMBER AND STRUCTURES BUILT THEREFROM. The '271 patent relates to a high-strength, lightweight, basic beam of a single shape which can serve as a column, truss, girder, jamb or other structural member whereby an entire structure can be built using the same basic beam for all of the structural members. The basic structure comprises a unitary, elongated rigid beam having a pair of parallel, opposed channel-shaped portions connected by a pair of spaced walls positioned inwardly from the sides of the channels to define a longitudinally extending slot therebetween and a pair of opposed recesses.

U.S. Pat. No. 3,835,615 issued to King, Jr. on Sep. 17, 1974 is entitled FASTENER JOINT CONSTRUCTION. This reference illustrates a joint assembly including work pieces with aligned holes of a prescribed diameter therethrough, a fastener in the holes and having a shank portion a prescribed amount less in diameter than the holes, and a metal sleeve member positioned between the shank portion of the fastener and the work pieces within the holes and in bearing contact with both the shank portion and the work pieces.

Finally, U.S. Pat. No. 3,810,339 issued to Russo on May 14, 1974 is entitled METHOD AND APPARATUS FOR FORMING CONSTRUCTION ELEMENT LOCATING AND MOUNTING VOIDS IN A POURED CONCRETE STRUCTURE, and illustrates an assembly comprised of desirably spaced sleeves interconnected to a framework within a concrete form by means of noncorrosive studs protruding from the base of each sleeve. The sleeves provide receptacles for mounting guardrails.

However, none of the prior art references, either alone or in combination with one another, teach or suggest the particular solutions to the problems addressed by the instant invention.

Accordingly, what is needed in the guardrail and handrail industry is an improved embed system that removes the possibility of corrosion and concrete spalling, thus increasing the length of the life and safety of the balcony and guardrail. It is, therefore, to the effective resolution of the aforementioned problems and shortcomings of the prior art that the present invention is directed. However, in view of the guardrail and handrail systems in existence at the time of the present invention, it was not obvious to those persons of ordinary skill in the pertinent art as to how the identified needs could be fulfilled in an advantageous manner.

SUMMARY OF THE INVENTION

The present invention contemplates an improved and modified railing system which is corrosion resistant, as well as a method for the installation. The system designs are applicable to both new construction and the repair of existing rail systems. The invention is a stainless steel insert that is placed inside a rail post and then is secured to the post for structural rigidity. The stainless steel insert has an enlarged head or upper body, and lower arm which exits the bottom of the railing post when installed. This lower arm can constitute a rod, pin, stud or shaft of varying shapes, for example cylindrical, rectangular, hexagonal, oblong or other shape as desired. In a primary embodiment, the lower arm is a cylindrical rod having a smaller radial dimension and cross-sectional area than the upper body.

The lower arm, and relatively narrow end, may be serrated, notched or may be smooth. A discontinuous surface assists with stability, bonding with concrete, and permanent mounting. The stainless steel insert has the aforementioned upper body, being a larger section that has a similar shape complementing the railing post and is sized to be friction fit within the railing post. The larger upper section also is equipped with channel means which allow any moisture or liquid to exit the railing post. The upper section may have any applicable shape depending on the rail posts used in design of the system, for example, square, cylindrical, hexagonal, or the like. The stainless steel insert are preferably composed of either 304 or 316 stainless steel, as they are alloys highly compatible with both aluminum and concrete. 304 and 316 stainless steel can handle alkaline and acidic conditions in the most corrosive conditions because they have a low carbon content. As an alternative design, the insert may be constructed of aluminum. The upper section and the lower arm may be cast aluminum to be one piece. The use of aluminum and either 304 or 316 type stainless steel prevents electrolysis and corrosion of the aluminum and eventual spalling of the concrete.

The method of installing the stainless steel insert is also an improvement. A hole is drilled into a concrete balcony. The hole is between one and one and a half inches in diameter and a depth of between 2 and 3 and one half inches depending on the load requirement of the post. Drilling a hole with such a small diameter prevents unwanted contact with the reinforcement bars.

The stainless steel insert is then inserted into the drilled hole and is secured with an epoxy or an acrylic adhesive which does not deteriorate over time as does concrete. Further, the epoxy or acrylic is impervious to water. The epoxy or acrylic will not expand or contract with the concrete. The epoxy or acrylic bonds with both the concrete and the stainless steel insert and this property prevents saltwater intrusion.

In accordance with the instant invention, it is an object thereof to provide an improved corrosion resistant railing and method for installation.

It is a further object to provide a corrosion resistant railing that allows water or moisture to escape.

It is a further object to provide corrosion resistant railing that will not cause the rust stains usually present with traditional drilling methods.

It is a further object to provide corrosion resistant railing that will not cause electrolysis and spall the concrete.

It is a further object to provide a corrosion resistant rail system that is cost effective and operationally efficient.

Finally, it is an object to provide a corrosion resistant rail system that provides all of the above mentioned features and objectives.

In accordance with these and other objects which will become apparent hereinafter, the instant invention will now be described with particular reference to the accompanying drawings.

DETAILED DESCRIPTION

The instant invention has been shown and described herein in what is considered to be the most practical and preferred embodiment. It is recognized, however, that departures may be made therefrom within the scope of the invention and that obvious modifications will occur to a person skilled in the art.

Figure 1:
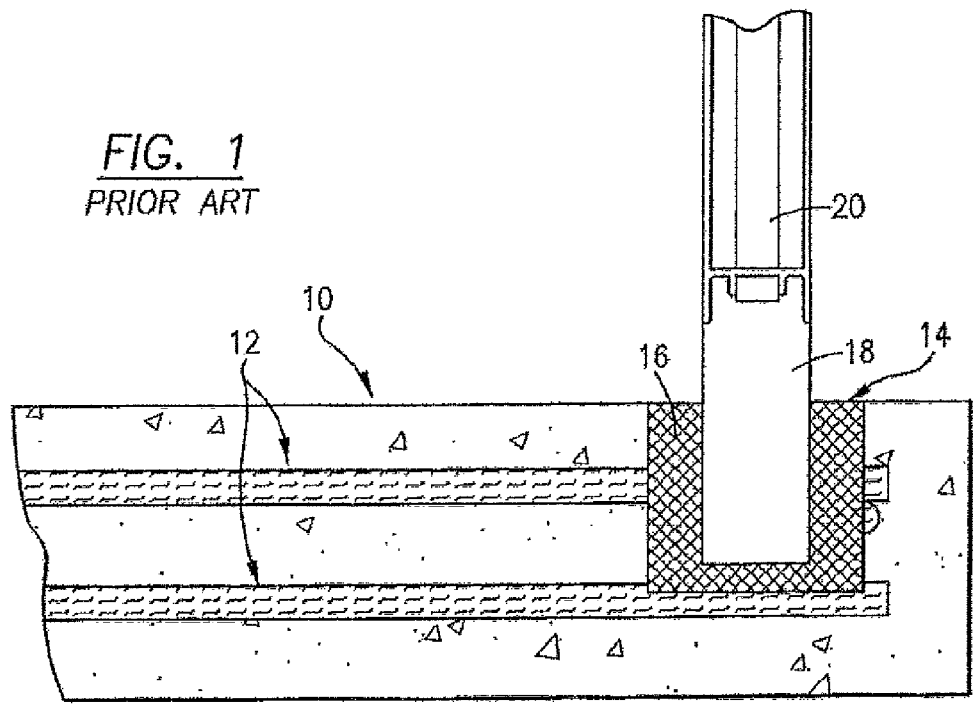
FIG. 1 shows a cross sectional view of a railing as found in the prior art.

FIG. 1 shows a cross sectional view of a railing 18 as found in the prior art. The railing 18 is inserted into a concrete balcony slab 10. The railing 18 is most likely composed of aluminum. A hole 14 is drilled into the concrete slab 10 in order to insert the railing 18. The drilled hole 14 should be around four inches in diameter and three and a half inches in depth and must be drilled as close to the edge of the concrete slab 10 as possible. The railing 18 is secured within the hole 14 through the use of an hydraulic or gypsum based cement 16. When drilling the hole 14, steel reinforcement bars 12 often obstruct the path of the drill and the bars 12 may be accidentally cut. Each time the reinforcement bars 12 are cut, electrolysis occurs. When this occurs, the aluminum post 18 becomes the "sacrifice metal" and causes it to expand. When the aluminum post 18 expands, the surrounding concrete 16 begins to spall and causes the aluminum post 18 to disintegrate. The type of aluminum used in composing the hand railing varies, however it is always an alloy. For structural extrusions such as posts, the type of aluminum used shall be 6061-T6 or 6005-T5 Alloy/Temper. For all other extrusions such as caps, pickets, mid and bottom rails, the aluminum used shall be at least 6063-T5. For castings, the aluminum used must be high quality prime material or materials remelted from a prime extrusion. The grout typically used is nonshrink, nonmetallic grout or erosion resistant anchoring cement.

Posts may be anchored into concrete by means of preset sleeves into concrete. After the posts have been inserted into sleeves, fill the space between the post and sleeve solid with anchoring material. First anchor posts into concrete by core drilling holes not less than 3" deep and 1" greater than the outside diameter of the post. Clean the holes of all loose material, insert the posts, and fill the space between the post and concrete with anchoring material. The anchoring material used can be either nonshrink, nonmetallic grout or anchoring cement. Leave the anchoring material down approximately ½" to allow for the final topping with a waterproof material matching the surrounding areas. Whenever possible, fill the holes with waterproof topping slightly higher than the adjacent surfaces and taper and taperaway from the post.

Over time, the gypsum based material or cementitious grouts 16 around the aluminum post 18 deteriorates. When the gypsum based material 16 deteriorates, it forms a vacant pocket around the aluminum post 18 and thus allows moisture or liquid to enter. Oftentimes, these types of railings are used in coastal settings and are thus subject to infiltration by saltwater. When saltwater invades, the surrounding concrete slab 10 becomes less alkaline in nature. When the concrete slab 10 becomes less alkaline, the reinforcement bars 12 expand due to corrosion. When the reinforcement bars 12 expand, the concrete 10 begins to form hairline cracks which allow the intrusion of further saltwater causing further spall. This reaction spreads and reduces the structural integrity of the concrete slab 10, causing damage to a balcony and may cause the aluminum railing 18 to become loose and fall off.

Figure 2:
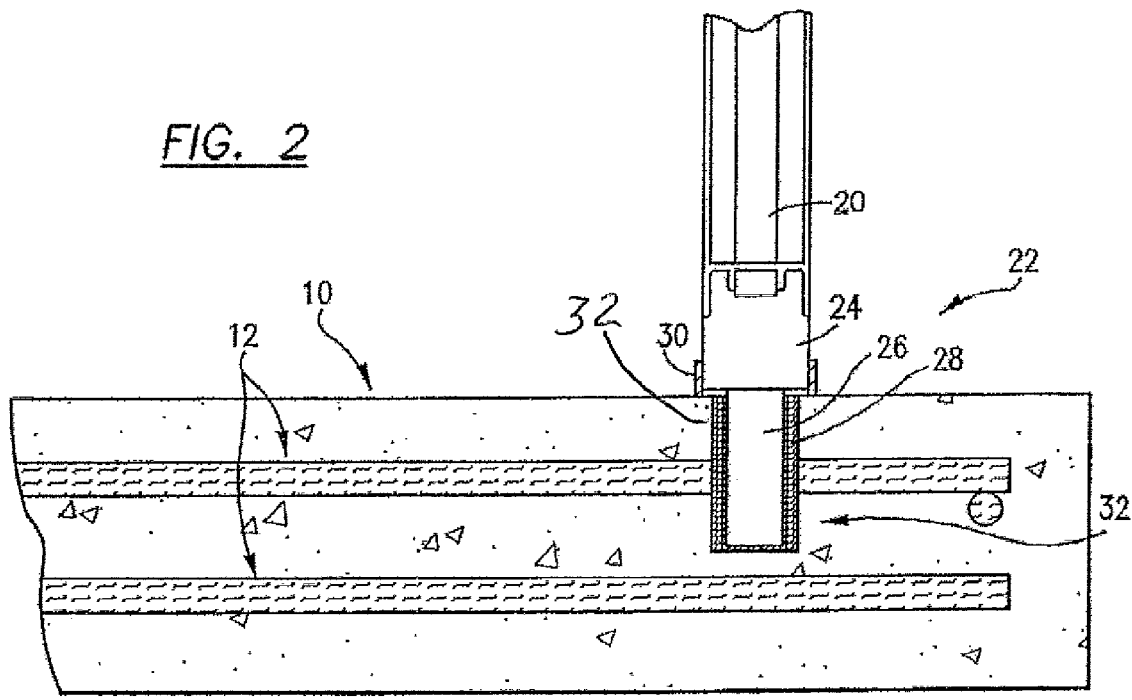
FIG. 2 shows a cross sectional view of the present invention corrosion resistant railing insert.

FIG. 2 shows a cross sectional view of the present invention corrosion resistant railing insert 22. The railing insert 22 is inserted into a concrete slab 10 having reinforcement bars 12. A hole 32 is drilled into the concrete slab 10 with a relatively small diameter of between one inch and one and one half inches. Further, the hole 32 will have an embed of between two inches and three and one half inches. The depth of the embed depends upon the load requirement of the railing 20. With such a small hole 32 drilled, the reinforcement bars 12 are not at risk of being cut and causing electrolysis.

The railing insert 22 is comprised of a narrow diameter lower arm 26 and an upper body with larger surface area 24. The upper body 24 inserts into the railing post 20 and the lower arm 26 inserts into the hole drilled into the concrete slab 10. The lower arm 26 is secured within the drilled hole 32 with an epoxy or acrylic adhesive 28 that is impervious to water. This adhesive 28 will not expand or contract as does the gypsum based concrete 16. Further, the adhesive 28 bonds with both the concrete 10 and the railing insert 22 and thus prevents any intrusion of water. It is further contemplated that an escutcheon 30 may be inserted between the upper body 24 of the railing insert 22 and the concrete balcony 10.

Figure 3:
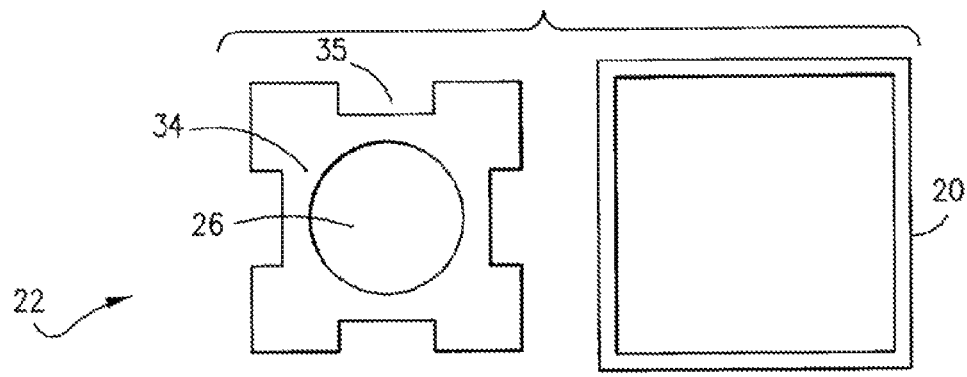
FIG. 3 shows a top plan view of a particular shape of the corrosion resistant railing insert and the railing post into which it is inserted.

It is important to note that in the preferred embodiment, the upper body 24 does not contact the cement slab. Air gaps and spaces 29 assist with drainage, as described hereinafter. An escutcheon 30 is largely cosmetic, and can be discontinuous to avoid interference with drainage. The railing insert 22 may be comprised of aluminum, it may also be comprised of either type 304 or type 316 stainless steel because 304 and 316 stainless steel are the only alloys that are compatible with aluminum and concrete. 304 and 316 stainless steel do not react to alkaline and acidic conditions in the most corrosive environments due to their low carbon content. It is also contemplated that the railing insert may be constructed of aluminum. FIG. 3 shows a top plan view of a particular shape of the corrosion resistant railing insert 22 and a particular shape of the railing post 20 into which it is inserted. The particular railing insert 22 in FIG. 3 has a square shaped upper body 34, the body further containing a plurality of channel means 35, which provide for drainage of deleterious liquid. In one embodiment, the mounting arm or lower arm 26 of the instant invention can be a cylindrical rod which extends through the upper body 24, and is integral thereto. In alternative embodiments, the upper body 24 and mounting arm 26 constitute a unitary device. It is contemplated that the upper body 24 and the mounting lower arm 26 can be cast together and composed of aluminum. The channel means 35 allows any liquid to exit the railing post 20. The channel means 35 can be rectangular or curved grooves of different geometries, or recesses within the upper body 24 which allow liquid outflow from the rail post.

The upper body 24 is also significant, in that it strengthens the rail post itself. The upper body 24 is a substantial metal support for the base of the aluminum rail, is mounted internally, and is a much stronger metal.

Figure 4:
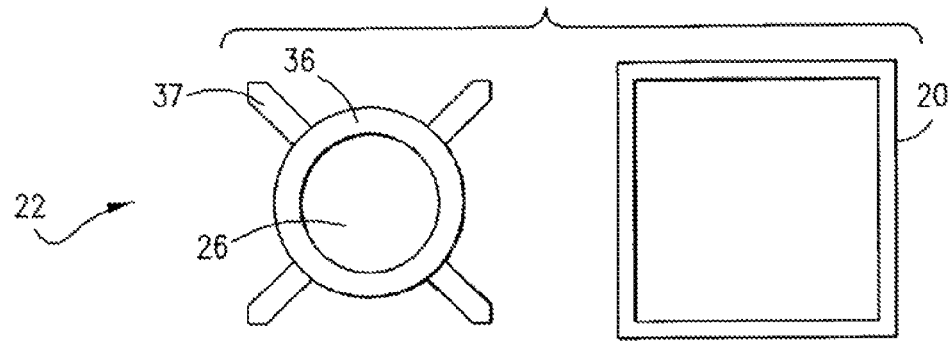
FIG. 4 shows a top plan view of a second particular shape of the corrosion resistant railing insert and the railing post into which it is inserted.

FIG. 4 shows a top plan view of a second particular shape of the corrosion resistant railing insert 22 and the railing post 20 into which it is inserted. At the center of the insert 22 can be a cylindrical rod 26 which extends through the upper body 24 to become the lower arm 26. The second embodiment for the particular railing insert 22 in FIG. 4 has a circular cylindrical body 36 and four channel means or fins 37 which protrude from the body 36. The fins 37 allow any liquid to exit the railing post 20, through the vacant spaces between any two adjacent fins.

Figure 5:
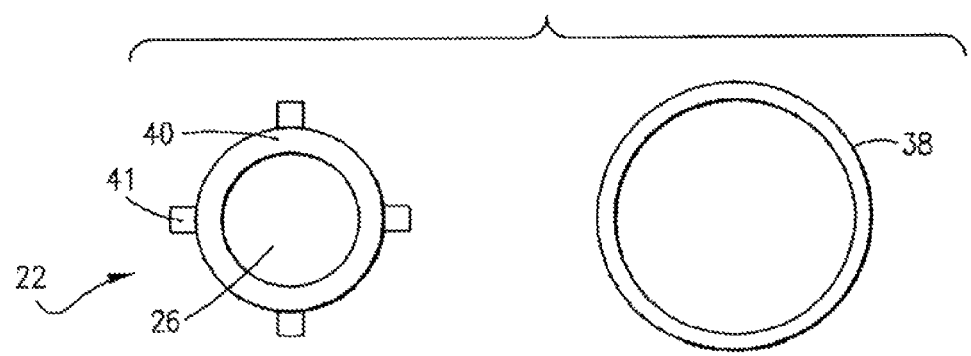
FIG. 5 shows a top plan view of a third particular shape of the corrosion resistant railing insert and the railing post into which it is inserted.

FIG. 5 shows a top plan view of a third particular shape of the corrosion resistant railing insert 22 and the rounded railing post 38 into which it is inserted. At the center of the insert 22 is a cylindrical rod 26 which extends through the upper portion 24 to become the lower arm 26. The third particular railing insert 22 in FIG. 5 has a circular cylindrical body 40 and four short channel means or fins 41 which protrude from the body 41. The railing post 38 into which the railing insert 22 is inserted is also circular. The fins 41 allow any liquid to exit the railing post 38.

Figure 6:
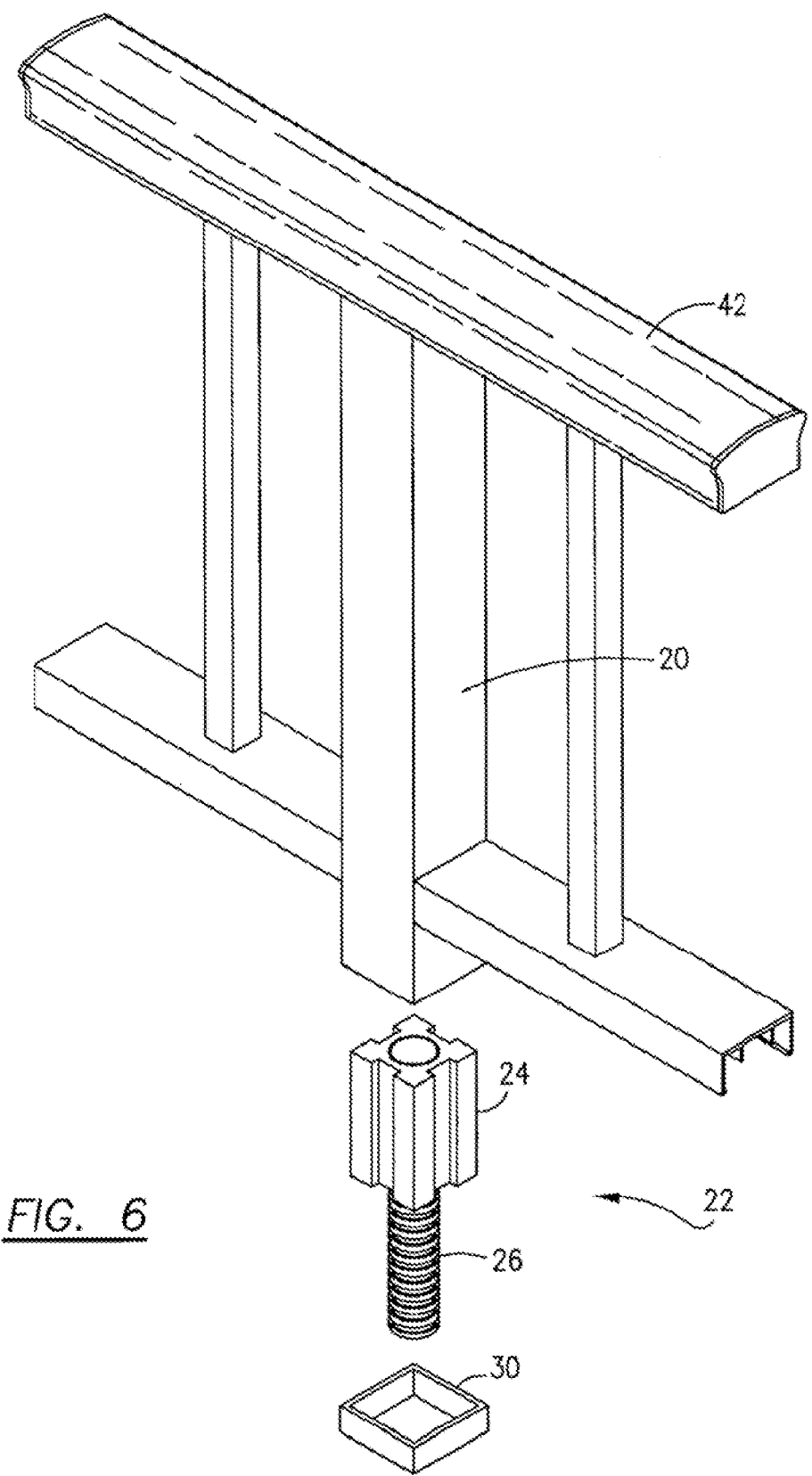
FIG. 6 shows an exploded perspective view of the corrosion resistant railing insert and the railing post into which it is inserted.

FIG. 6 shows an exploded perspective view of the corrosion resistant railing insert 22 and the railing post 20 into which it is inserted. The figure shows that a handrail 42 is connected to the railing post 20. The upper body 24 of the railing insert 22 is inserted into the bottom of the railing post 20. The lower arm 26 remains outside of the railing post 20 when installed.

Figure 7:
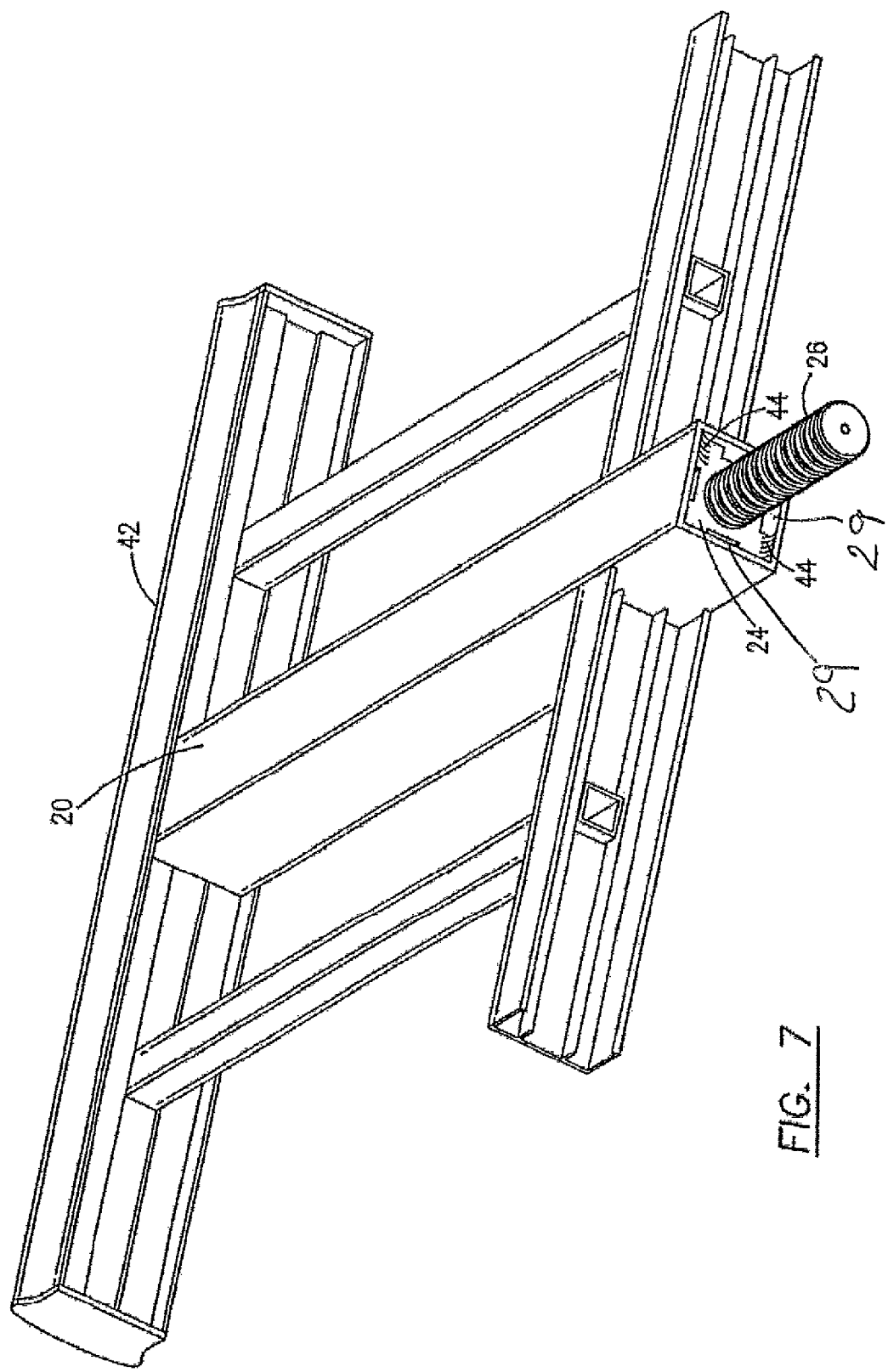
FIG. 7 shows an underneath perspective view of the corrosion resistant railing insert inserted into the railing post.

FIG. 7 shows an underneath perspective view of the upper body 24 of the corrosion resistant railing insert inserted into the railing post 20. As shown, once the upper body 24 is inserted, it is secured in place through a variety of methods 44. It is contemplated that the upper body 24 may be secured with welding, hydraulic press fitting, glue, pinch pressing, or able to be set with a stainless steel screw.

What is claimed is:

1. A corrosion resistant railing insert device for supporting a railing system in a concrete substrate, said device comprising:

a upper body for permanent insertion into and attachment to a railing post;

said upper body further including at least one channel, said channel extending between an upper end and lower end of said upper body;

an elongated cylindrical mounting arm for insertion into and securable in a complementary receiving aperture in the concrete substrate surface, said mounting arm protruding downward from said upper body, said mounting arm being of a smaller cross-sectional area than said upper body;

said upper body and said mounting arm comprise a unitary device;

wherein said upper body is secured within a railing post; and said upper body and said mounting arm comprising a metal material that is compatible with aluminum and concrete and impervious to alkaline and acidic conditions so as to avoid corrosion and electrolysis.

2. The corrosion resistant railing insert described in claim 1, wherein said upper body is hydraulic press fitted to the railing post.

3. The corrosion resistant railing insert described in claim 1, wherein said upper body is glued to the railing post.

4. The corrosion resistant railing insert described in claim 1, wherein said upper body is pinched pressed to the railing post.

5. The corrosion resistant railing insert described in claim 1, further comprising a set screw for securing said upper body to said railing post.

6. The corrosion resistant railing insert described in claim 1, further comprising a welding bond between said upper body and the railing post.

7. The corrosion resistant railing insert described in claim 1, wherein said upper body comprises aluminum.

8. The corrosion resistant railing insert described in claim 7, wherein said upper body and said lower arm are permanently cast together.

9. The corrosion resistant railing insert described in claim 1, wherein said upper body comprises 316 type stainless steel.

10. The corrosion resistant railing insert described in claim 1, wherein upper body comprises 304 type stainless steel.

11. The corrosion resistant railing insert described in claim 1, wherein said mounting arm comprises a contoured surface to enhance bonding with a adhesive bonding agent.

12. The corrosion resistant railing insert disclosed in claim 1, wherein said upper body is sized for a friction fit in the railing post.

13. The corrosion resistant railing insert disclosed in claim 1, wherein said channel facilitates the drainage of liquid from the railing post.

14. The corrosion resistant railing insert disclosed in claim 1, wherein said metal material comprises stainless steel.

15. The corrosion resistant railing insert disclosed in claim 1, wherein said metal material comprises aluminum.

16. The corrosion resistant railing insert disclosed in claim 1, further comprising an adhesive means for insertion in said concrete substrate aperture between said mounting arm and said concrete, said adhesive means being bondable to said mounting arm and said concrete.

17. The corrosion resistant railing insert disclosed in claim 1, wherein said adhesive means comprises epoxy.

18. The corrosion resistant railing insert disclosed in claim 1, wherein said adhesive means comprises acrylic.

* * * * *